US012274347B2

(12) United States Patent
Labeylie et al.

(10) Patent No.: US 12,274,347 B2
(45) Date of Patent: Apr. 15, 2025

(54) COSMETIC DISTRIBUTOR OF A FLUID PRODUCT

(71) Applicant: TEXEN, Brion (FR)

(72) Inventors: Margot Labeylie, Cormoz (FR); Denis Paccaud, Lyons (FR)

(73) Assignee: TEXEN, Brion (FR)

( * ) Notice: Subject to any disclaimer, the term of this patent is extended or adjusted under 35 U.S.C. 154(b) by 0 days.

(21) Appl. No.: 18/672,482

(22) Filed: May 23, 2024

(65) Prior Publication Data

US 2024/0389735 A1 Nov. 28, 2024

(30) Foreign Application Priority Data

May 23, 2023 (FR) ....................................... 2305094

(51) Int. Cl.
*A45D 34/04* (2006.01)
*B05C 17/005* (2006.01)

(52) U.S. Cl.
CPC ........ *A45D 34/041* (2013.01); *A45D 2200/10* (2013.01); *B05C 17/00503* (2013.01); *B05C 17/00516* (2013.01)

(58) Field of Classification Search
CPC ...... A45D 34/041; A45D 22/10; A45D 34/00; A45D 2034/002; B05C 17/005; B05C 17/00503; B05C 17/00506; B05C 17/00516; B05C 17/00583
USPC ....................... 401/9–11, 183–186, 265, 266
See application file for complete search history.

(56) References Cited

U.S. PATENT DOCUMENTS 1,676,601 A 10/1926 Cavanaugh
2,008,636 A * 7/1935 Brynan .................. B65D 35/36 401/262
6,039,483 A * 3/2000 Szekely ................. A45D 40/08 401/175
6,868,991 B2 3/2005 Kuhn et al.
7,841,793 B2 * 11/2010 Ramet .................... A45D 34/04 401/265
7,984,832 B2 7/2011 Pivonka et al.
(Continued)

FOREIGN PATENT DOCUMENTS

JP 2012213469 A 11/2012
WO 2021001562 A1 1/2021

OTHER PUBLICATIONS

Preliminary Search Report and Opinion issued on Nov. 28, 2023, in corresponding French Application No. 2305094, 14 pages.

*Primary Examiner* — David J Walczak
(74) *Attorney, Agent, or Firm* — Maier & Maier, PLLC

(57) ABSTRACT

A compressible distributor for fluid product, of a longitudinal axis and of the type including an elastically compressible body intended to accommodate the fluid product an applicator mounted on the elastically compressible body and extending it longitudinally, and a longitudinal distributing member of the fluid product intended to convey the fluid product from the interior of the elastically compressible body in the direction of the applicator, the applicator is provided with two outlet orifices opening onto an external surface of the applicator and allowing the distribution of the fluid product, where the distributor has each outlet orifice, at the level of the external surface of the applicator, an elongated shape along an axis, and in that the axes of the two outlet orifices belong to the same plane parallel to the longitudinal axis.

15 Claims, 14 Drawing Sheets

(56) References Cited

U.S. PATENT DOCUMENTS

| | | | |
|---|---|---|---|
| 8,714,857 | B1 | 5/2014 | Liu |
| 2019/0038001 | A1 | 2/2019 | Beaute |

* cited by examiner

[Fig 1]
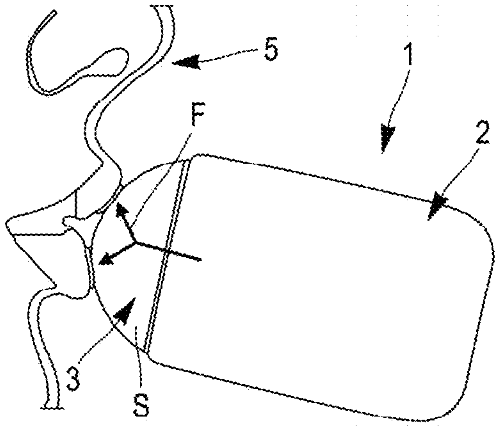
[Fig 2]
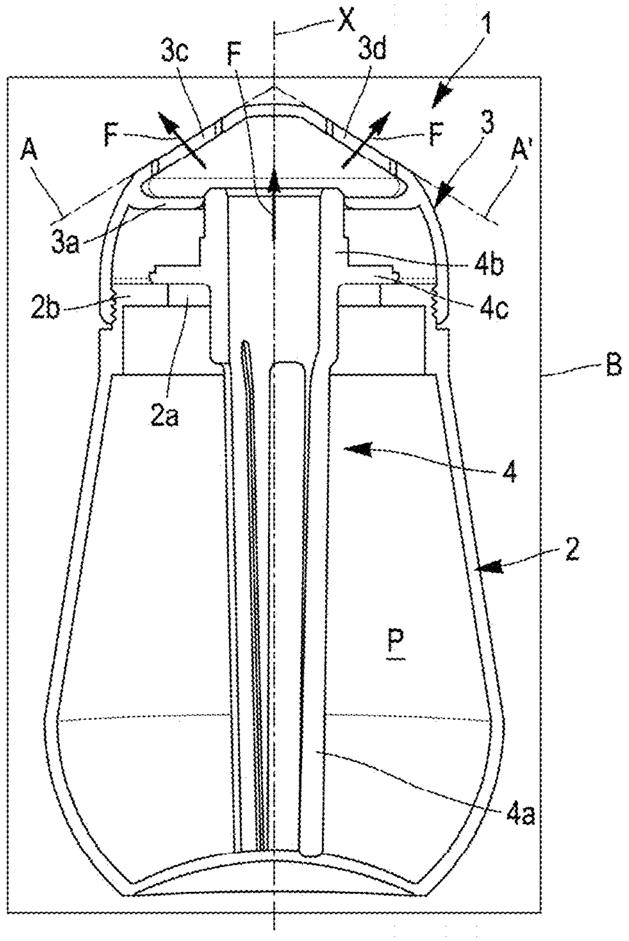

[Fig 3]
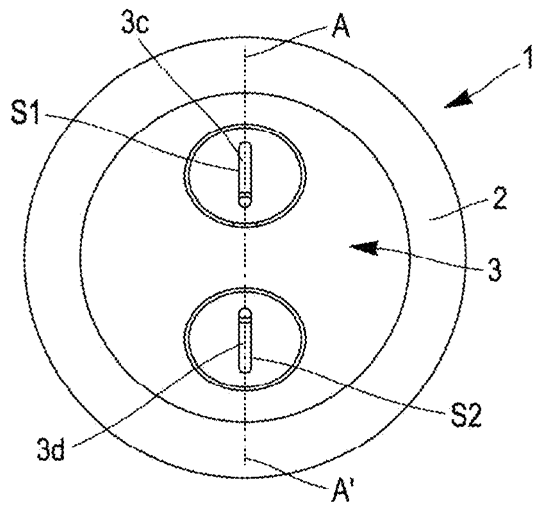
[Fig 4]
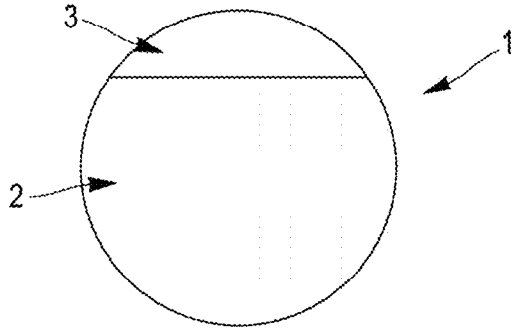
[Fig 5]
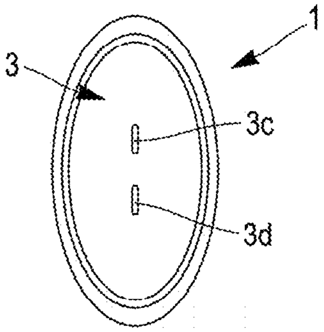

[Fig 6]
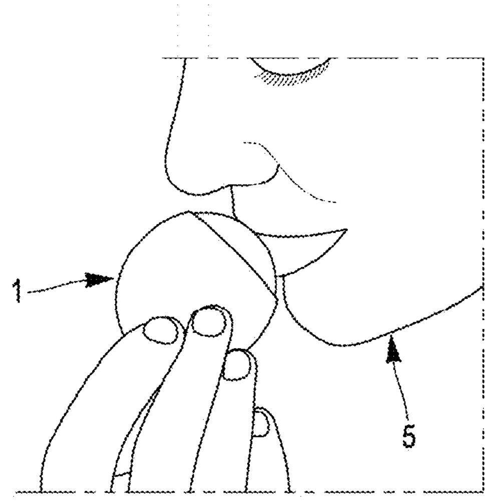
[Fig 7]
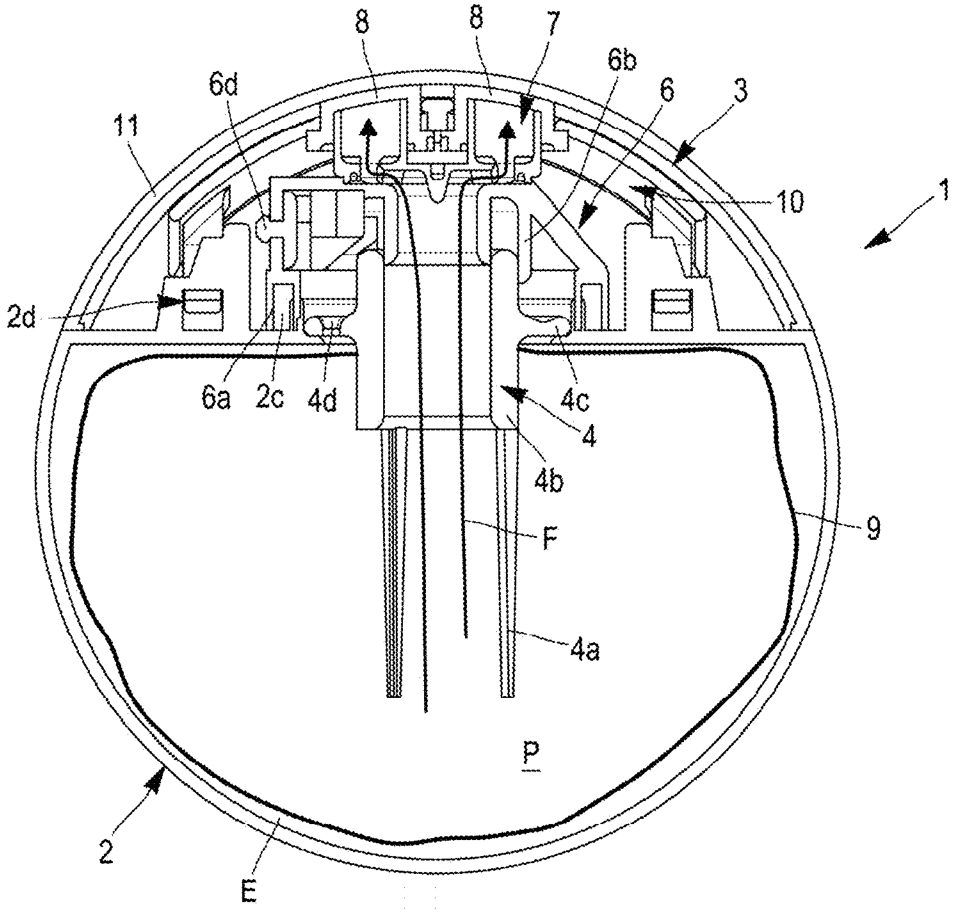

[Fig 8]
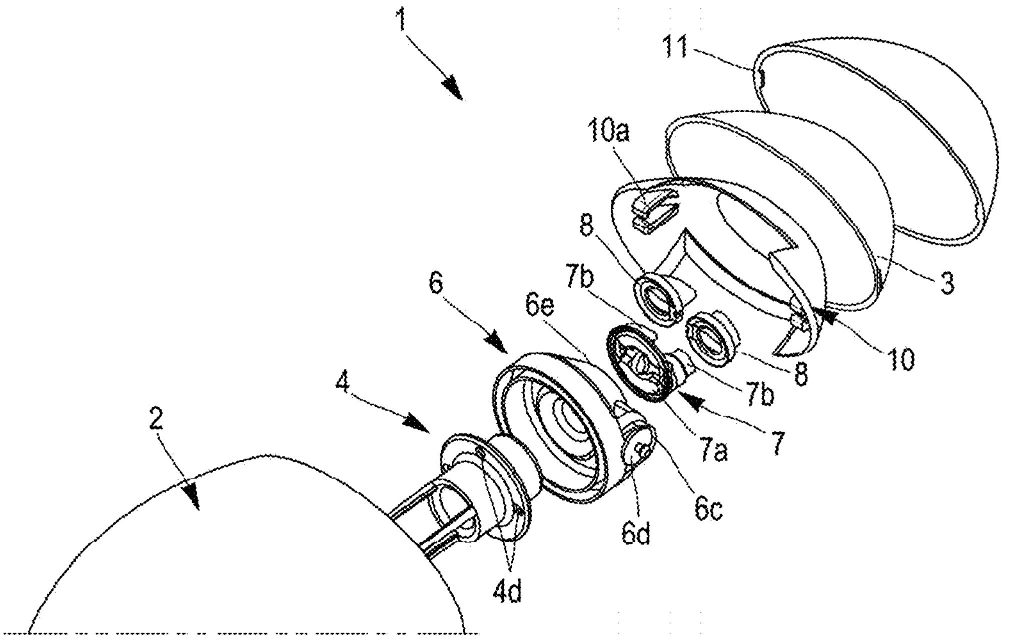
[Fig 9]
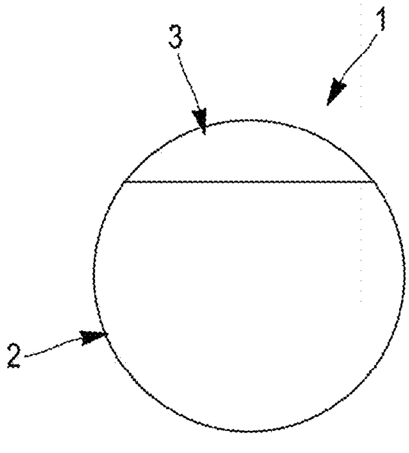

[Fig 10]
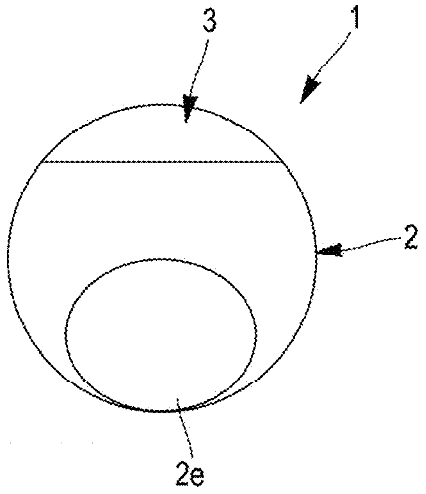
[Fig 11]
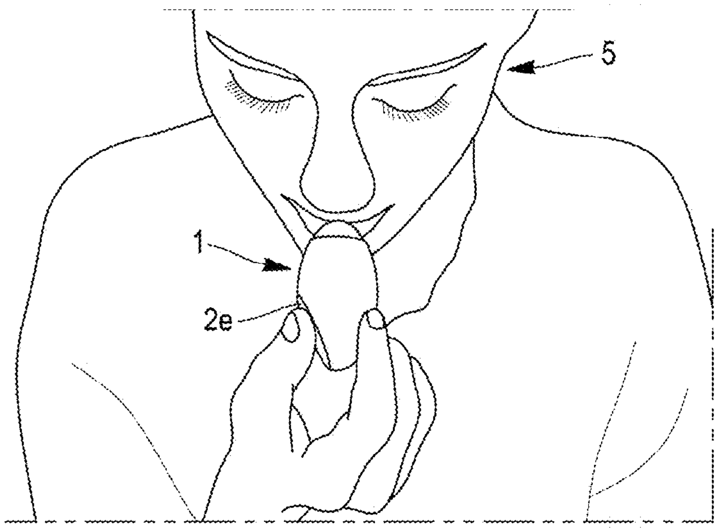

[Fig 12]
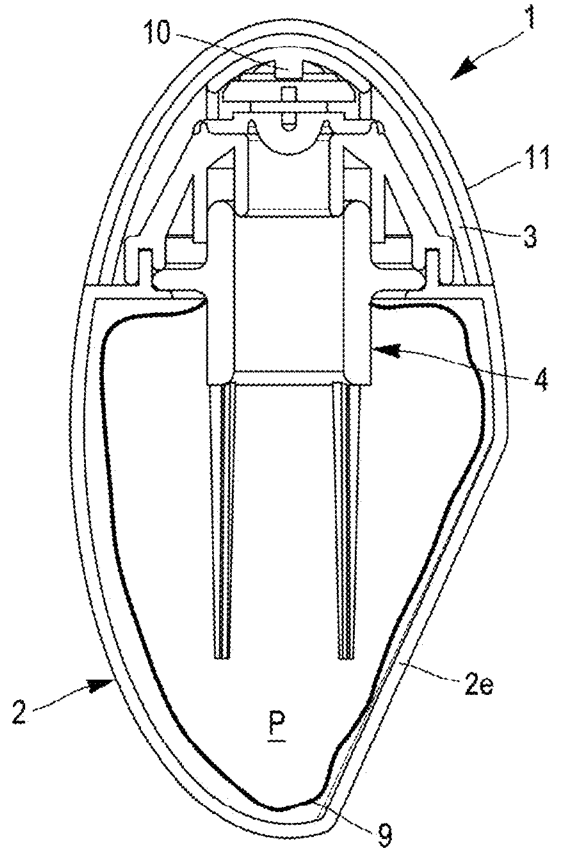
[Fig 13]
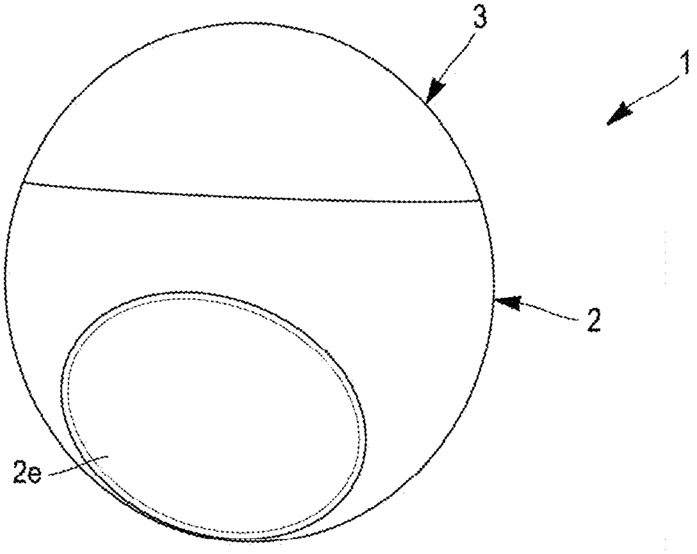

[Fig 14]
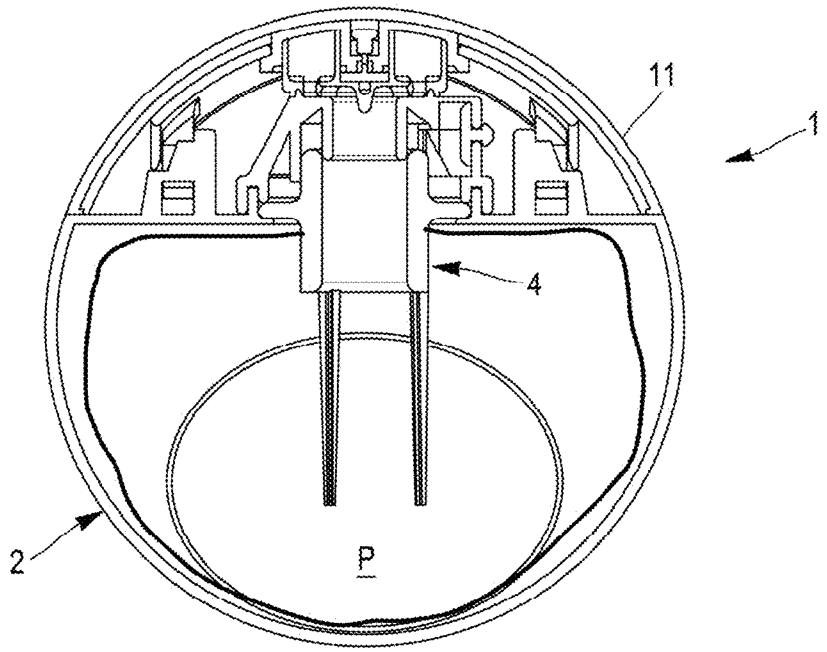
[Fig 15]
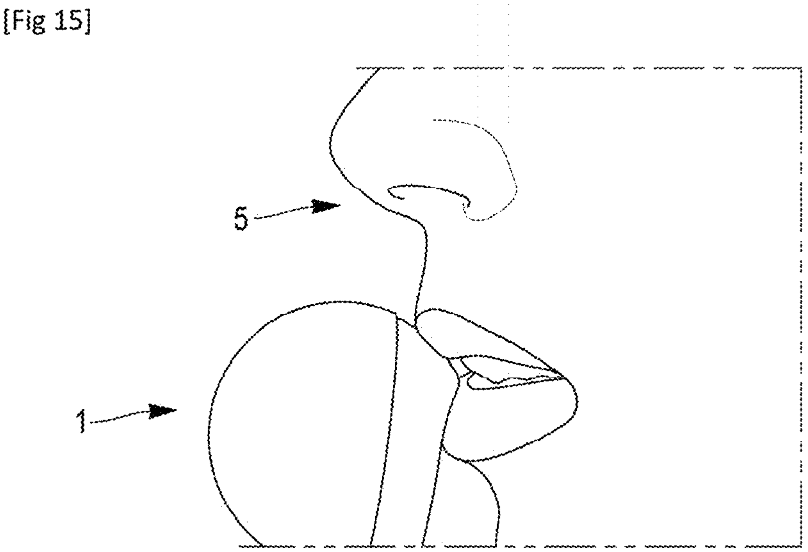

[Fig 16]
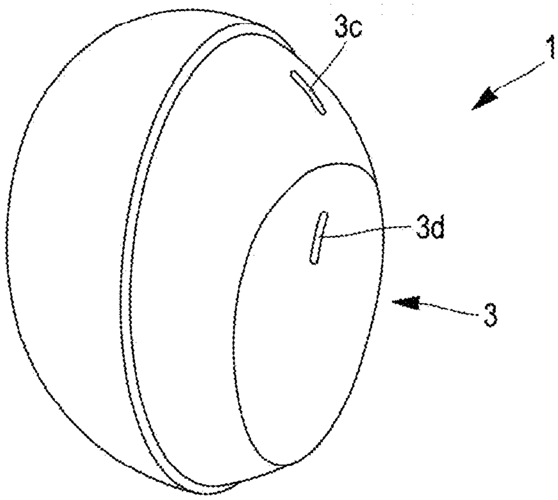
[Fig 17]
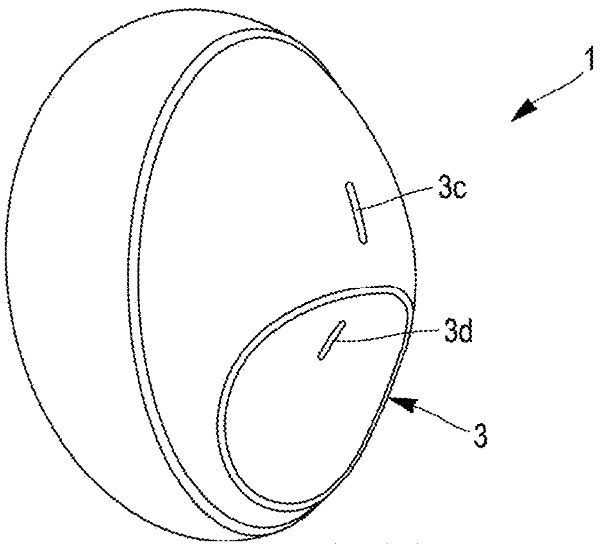

[Fig 18]
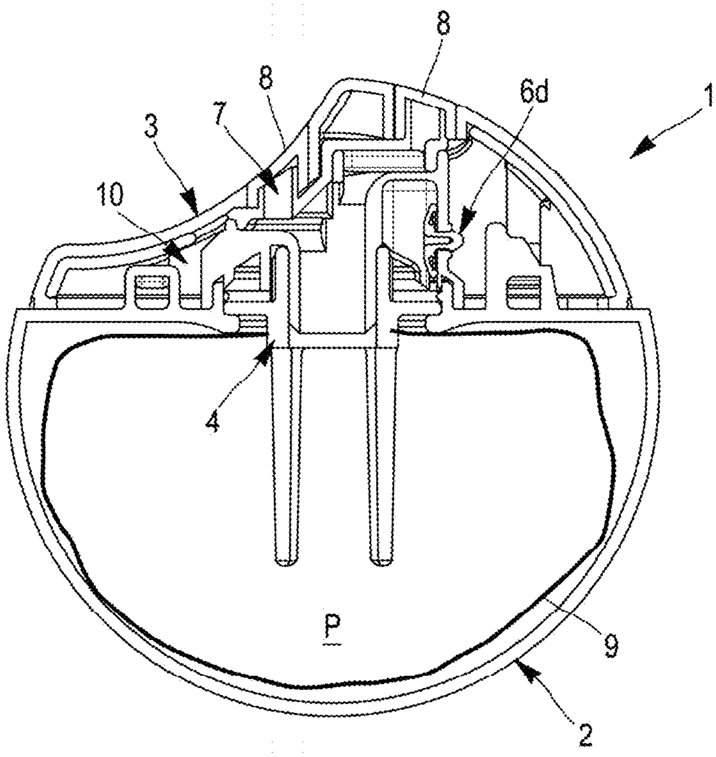
[Fig 19]
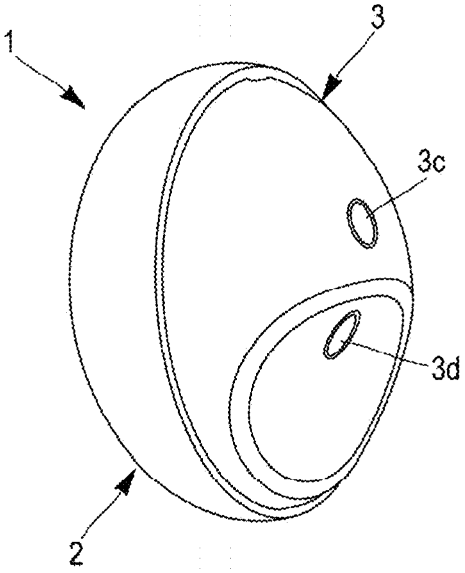

[Fig 20]
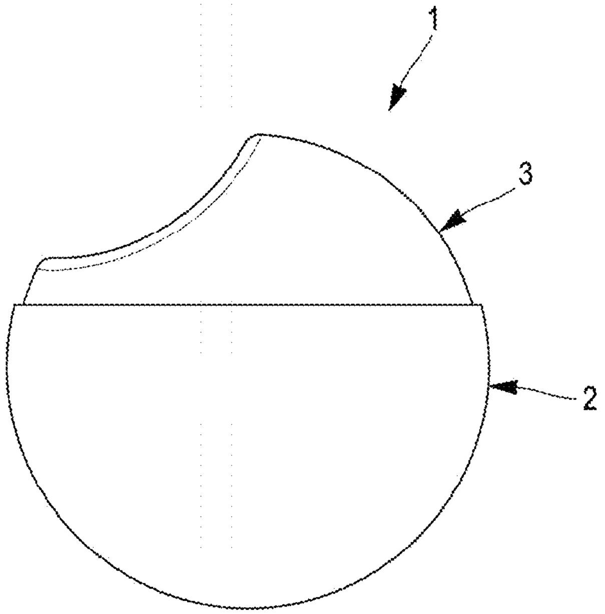
[Fig 21]
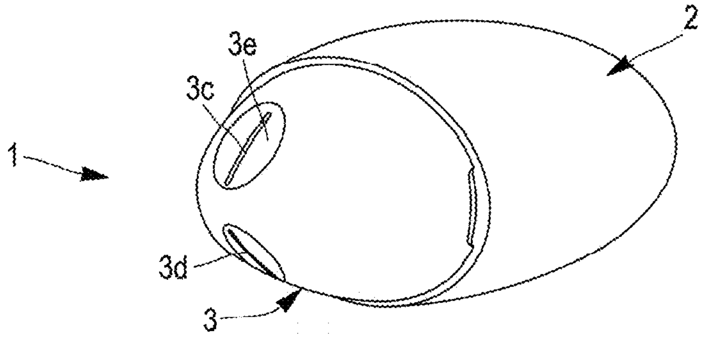
[Fig 22]
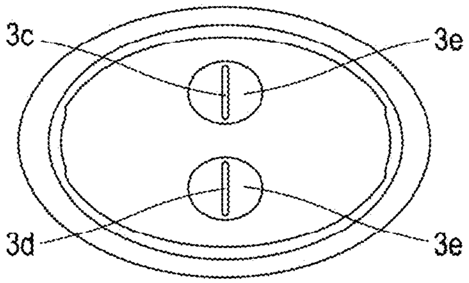

[Fig 23]
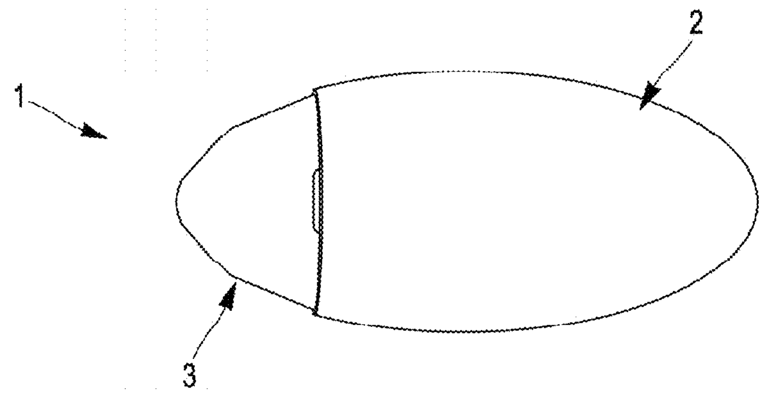
[Fig 24]
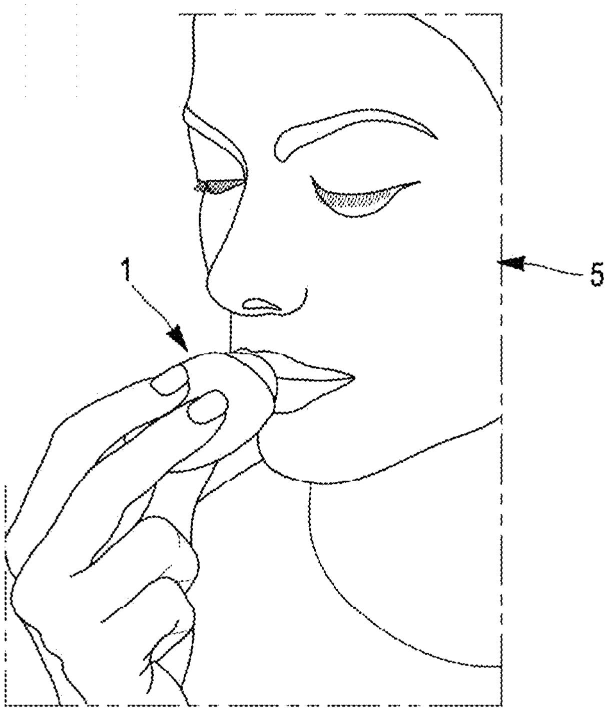

[Fig 25]
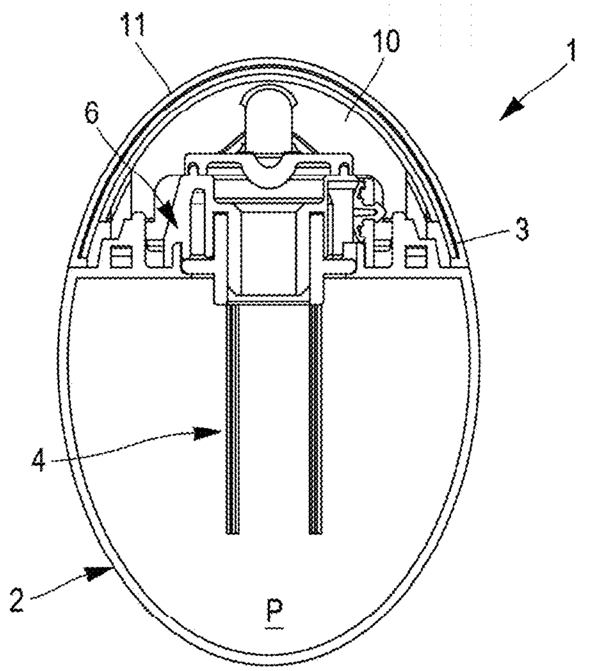
[Fig 26]
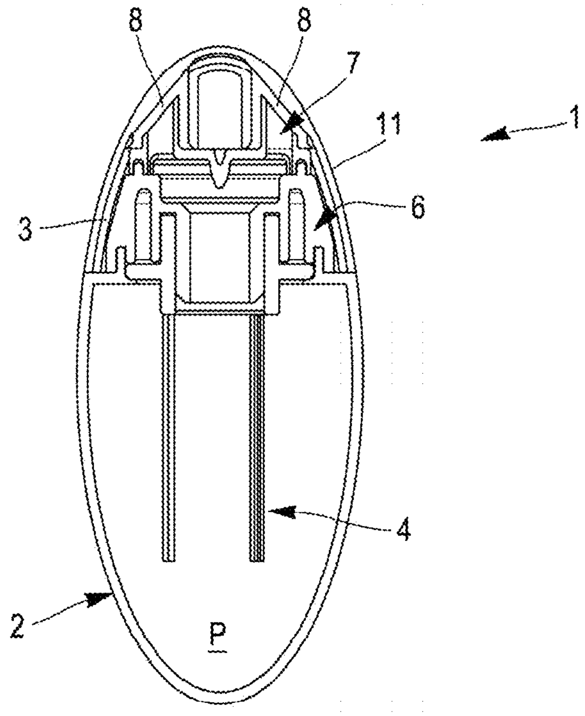

[Fig 27]
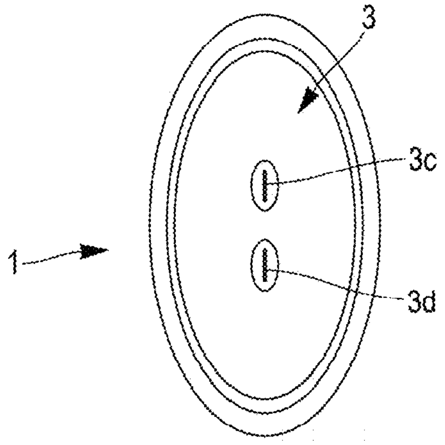
[Fig 28]
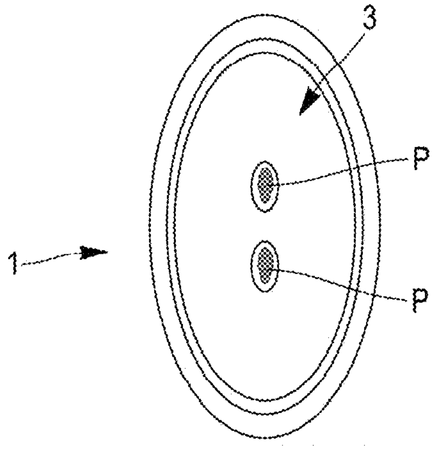
[Fig 29]
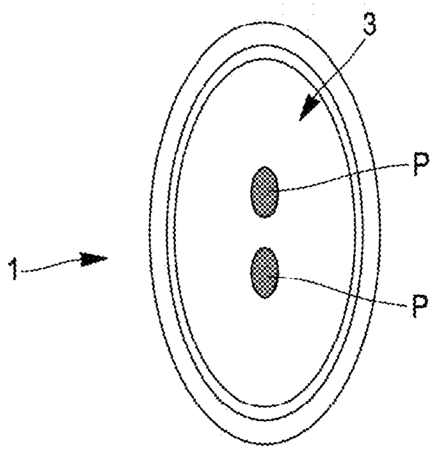

[Fig 30]
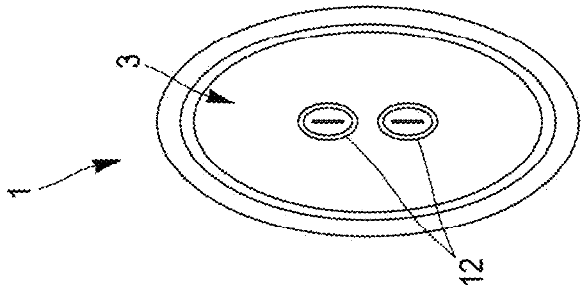
[Fig 31]
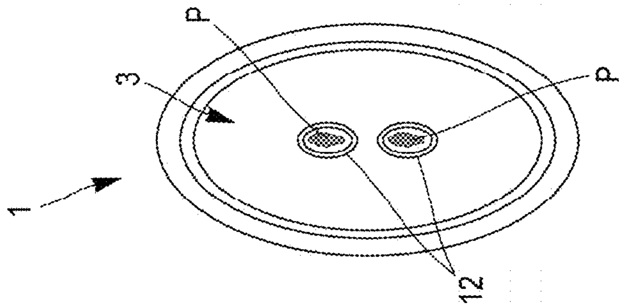
[Fig 32]
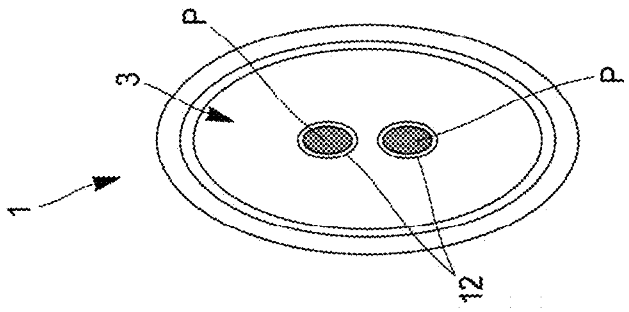
[Fig 33]
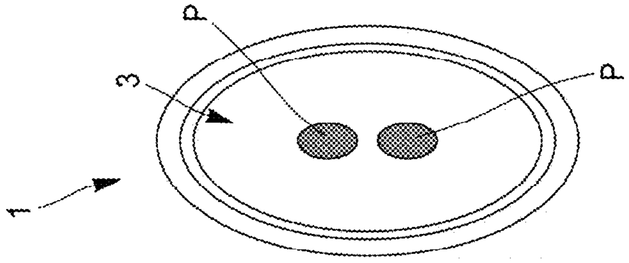

COSMETIC DISTRIBUTOR OF A FLUID PRODUCT

FIELD

The present invention concerns an elastically compressible distributor for a fluid product, in particular a cosmetic fluid product such as a cream and in particular a lip balm.

BACKGROUND

The compressible type distributors are typically those capable of delivering a fluid product under the action of manual pressure applied on their walls.

It is known from document U.S. 2019/038001 A1 a compressible distributor of fluid product. This distributor comprises an elastically compressible body, a member for distributing the liquid product having a fluid outlet orifice, and a cap being attached to the body making it possible to cover and protect the distributing member. The distributor comprises a flexible pouch which is placed inside the body and which contains the fluid product. The distributing member is in the form of a dip tube, one end of which extends towards the bottom of the flexible pouch and its other end includes a nipple provided with a slot providing the outlet orifice.

Nonetheless, this distributor has the disadvantage that it is not designed for distributing a cosmetic product on the lips.

It is also known from the document JP 2012213469 A a compact applicator for the lips. The wide, flat applicator, being sandwiched between the two lips, allows a cosmetic formula to be applied simultaneously to both lips. A formula outlet orifice is present on each face of the applicator.

This applicator is, nonetheless, not very ergonomic and applying the cosmetic formula on the lips is not easy.

SUMMARY

The present invention aims to remedy these drawbacks.

The invention thus relates to a compressible distributor of fluid product, of longitudinal axis and of the type comprising an elastically compressible body intended to accommodate the fluid product, an applicator mounted on the elastically compressible body and extending it longitudinally, and a longitudinal distributing member of said fluid product intended to convey the fluid product from the interior of the elastically compressible body towards the applicator, the applicator being provided with two outlet orifices opening onto an external surface of the applicator and allowing the distribution of the fluid product.

In accordance with the invention, each outlet orifice has at the level of the external surface of the applicator, an elongated shape along an axis, the axes of the two outlet orifices belonging to the same plane parallel to the longitudinal axis, preferably a plane passing through the longitudinal axis.

Alternatively, or in combination, the distributor is configured so that, at each orifice, the path of the fluid product opens onto the external surface of the applicator in a longitudinal direction.

Thus, thanks to the specific structure of the distributor, it is possible to apply the fluid product to both lips at the same time, in a simple and effective lateral gesture.

The axes of the two outlet orifices may be non-parallel, and may further be symmetrical with respect to the longitudinal axis of the distributor. In particular, the applicator can be provided with two unique outlet axes opening onto an external surface of the applicator and allowing the distribution of the fluid product, the axes of the two outlet orifices being non-parallel and belonging to the same plane parallel to the longitudinal axis.

The angle between the axes of the two outlet orifices, in said same plane parallel to the longitudinal axis, and seen from inside the distributor, can be comprised between 93° and 170°, and in particular between 93° and 160°, between 93° and 150°, between 103° and 170°, between 103° and 160°, between 103° and 150°, between 113° and 170°, between 113° and 160°, or between 113° and 150°.

The distributor can transversely have a large dimension and a small dimension, and said plane can be oriented in the direction of the large dimension or in the direction of the small dimension. In this case, the angle between the axes of the two outlet orifices, in said same plane parallel to the longitudinal axis, and seen from inside the distributor, can be comprised between 150° and 170°, preferably between 155° and 165°, and more preferably be equal to 160° (for example the embodiment of FIG. 7).

The distributor may in particular be in the shape of an ellipsoid.

The distributor may comprise a flexible pouch disposed inside the elastically compressible body and which comprises the fluid product to be distributed. The use of a flexible pouch coupled with a system of valves prevents air from leaving the elastically compressible body and thus allows a better rate of restitution of the fluid product, by increasing the pressure to press on the pouch. Furthermore, the use of a flexible pouch coupled with a valve system is more hygienic, with on the one hand an easier to clean applicator and on the other hand an airless system avoiding any contamination of the fluid product in the elastically compressible body. It can further be considered the limitation or even the elimination of preservatives in the product if the pouch is filled under sterile conditions.

The distributor may successively comprise, between the distributing member and the applicator, a connector and a dispenser.

The connector can be configured to direct the fluid product from the elastically compressible body (whether or not it is equipped with a flexible pouch) towards the dispenser, and the connector can comprise an orifice allowing to convey air to the inside the elastically compressible body, as well as a washer acting as a valve provided on said orifice so as to close said orifice when a user exerts a manual pressure on the elastically compressible body.

The dispenser can be configured to convey the product coming from the distributing member and having passed through the first connection to the two outlet orifices, the dispenser comprising two longitudinal tubes which each open onto an outlet orifice.

Each longitudinal tube is advantageously covered with a non-return valve, thus preventing air from entering the distributor.

The applicator may be convex in shape and the profile of the outlet orifices on the external surface of the applicator may also be convex.

The distributor may be generally convex and the elastically compressible body may comprise a plane.

A part of the applicator comprising a first outlet orifice may be convex, while a part of the applicator comprising a second outlet orifice may be concave. In this case, the angle between the axes of the two outlet orifices, in said same plane parallel to the longitudinal axis, and seen from inside the distributor, can be comprised between 107° and 134°, and in particular between 117° and 124°. It can in particular be comprised between 114° and 134°, preferably between 119° and 129°, and even more preferably be equal to 124° (for example the embodiment of FIG. 16), or it can be comprised between 107° and 127°, preferably between 112° and 122°, and even more preferably equal to 117° (for example the embodiment of FIG. 18).

The applicator may have a convex shape and the outlet orifices may each be located inside a plane of the applicator. In this case, the angle between the axes of the two outlet orifices, in said same plane parallel to the longitudinal axis, and seen from inside the distributor, can be comprised between 93° and 113°, preferably between 98° and 108°, and more preferably be equal to 103°.

Each outlet orifice can be surrounded by a dosage marking of the fluid product, for example a screen printing marking, a groove or a rib.

BRIEF DESCRIPTION OF THE DRAWINGS

Other characteristics and advantages of the present invention will appear on reading the detailed description below, of a non-limiting example of implementation, made with reference to the appended figures in which:

FIG. 1 is a general schematic perspective view of a compressible fluid product distributor according to the invention, in operational configuration of the device, FIG. 2 is a schematic longitudinal sectional view of a distributor according to the invention, in accordance with a first embodiment, FIG. 3 is a top view of the distributor of FIG. 2, FIG. 4 is a front view of a distributor according to the invention, in accordance with a second embodiment, FIG. 5 is a top view of the distributor of FIG. 4, FIG. 6 is a perspective view of the distributor of FIG. 4, in operational configuration of the device, FIG. 7 is a longitudinal sectional view of the distributor of FIG. 4, FIG. 8 is an exploded perspective view of the distributor of FIG. 4, FIG. 9 is a front view of a distributor according to the invention, in accordance with a third embodiment, FIG. 10 is a rear view of the distributor of FIG. 9, FIG. 11 is a perspective view of the distributor of FIG. 9, in operational configuration of the device, FIG. 12 is a first longitudinal transparent sectional view of the distributor of FIG. 9, FIG. 13 is a perspective view of the distributor of FIG. 9, FIG. 14 is a second longitudinal transparent sectional view of the distributor of FIG. 9, FIG. 15 is a front view of a distributor according to the invention, in accordance with a fourth embodiment, in operational configuration of the device, FIG. 16 is a perspective view of the distributor of FIG. 15, FIG. 17 is a perspective view of a variant of the distributor of FIG. 15, FIG. 18 is a longitudinal sectional view of a variant of the distributor of FIG. 15, FIG. 19 is a perspective view of a variant of the distributor of FIG. 15, FIG. 20 is a side view of a variant of the distributor of FIG. 15, FIG. 21 is a perspective view of a distributor according to the invention, in accordance with a fifth embodiment, FIG. 22 is a top view of the distributor of FIG. 21, FIG. 23 is a side view of the distributor of FIG. 21, FIG. 24 is a perspective view of the distributor of FIG. 21, in operational configuration of the device, FIG. 25 is a first longitudinal sectional view of the distributor of FIG. 21, FIG. 26 is a second longitudinal sectional view of the distributor of FIG. 21, FIG. 27 is a first top view of a distributor according to the invention, in accordance with a sixth embodiment, FIG. 28 is a second top view of the distributor of FIG. 27, FIG. 29 is a third top view of the distributor of FIG. 27, FIG. 30 is a first top view of a distributor according to the invention, in accordance with a seventh embodiment, FIG. 31 is a second top view of the distributor of FIG. 30, FIG. 32 is a third top view of the distributor of FIG. 30, and FIG. 33 is a fourth top view of the distributor of FIG. 30.

DETAILED DESCRIPTION OF THE EMBODIMENTS

As illustrated in FIGS. 1 to 3, a compressible distributor 1 of fluid product according to the invention, of the fluid cosmetic product type such as a cream, in particular a lip balm, has a longitudinal axis X and comprises an elastically compressible body 2 intended to accommodate the fluid product, an applicator 3 mounted on the elastically compressible body 2 and extending it longitudinally, as well as a distributing member 4 of the fluid product intended to convey the fluid product from the inside of the body 2 and towards the applicator 3. The distributor 1 can also comprise a cover, not shown. The cover protects the applicator 3 when not in use.

The elastically compressible body 2, the applicator 3 and the distributing member 4 advantageously each have a symmetry of revolution about the longitudinal axis X.

The elastically compressible body 2 is intended to be deformed by manual pressure. It is made of an elastically deformable material and its walls can be compressed while being sufficiently elastic to return to their initial shape when the pressure ceases. For this purpose, the elastically compressible body 2 can be made of rubber, elastomer or thermoplastic material. It has an upper orifice 2*a*.

The distributing member 4, of longitudinal orientation, comprises a lower part comprising a plurality of longitudinal tabs 4*a*, the lower part being arranged inside the body 2. The distributing member 4 also comprises a cylindrical upper part 4*b* which is surrounded by an annular rim 4*c* forming a collar and intended to bear on an upper annular edge 2*b* of the elastically compressible body 2 delimiting the upper orifice 2*a*. The collar 4*c* is advantageously provided with orifices 4*d* (FIG. 8) allowing air to enter inside the body 2.

The applicator 3 is the part of the distributor 1 allowing the application of the fluid cosmetic product, in particular on the lips of a user. It advantageously has a shape adapted to the lips which can be in a convex and symmetrical or asymmetrical case in order to deliver more formula on the lower lip which is more fleshy. The applicator 3 is mounted on the upper edge 2*b* of the body 2, for example by screwing about said upper edge 2*b*. The applicator 3 comprises, approximately halfway between its lower end and its upper end, an orifice led into a transverse wall 3*a* of the applicator 3. The orifice accommodates and guides longitudinally the upper end of the cylindrical part 4*b* of the distribution body.

The applicator 3 is provided in its upper part with two outlet orifices 3*c*, 3*d*. Each outlet orifice 3*c*, 3*d* is advantageously in the form of a slot, that is to say a narrow and elongated opening. The axes A and A' of the orifices 3*c* and 3*d* respectively on the external surface S of the applicator 3 are non-parallel and advantageously belong to a longitudinal plane B parallel to the longitudinal axis X of the distributor 1. Preferably, the longitudinal axis X belongs to the longitudinal plane B. The axes A and A' can be symmetrical or not with respect to the longitudinal axis X.

The profile S1, S2 of the orifices 3*c*, 3*d* on the surface of the applicator 3 may be a rectilinear profile, contained in a plane, and may for example be rectangular or oblong. It can also be envisaged that the profile S1, S2 of the orifices 3*c*, 3*d* on the surface of the applicator 3 is non-rectilinear, for example curved (and in particular concave or convex). In this case, the axis of the orifice on the external surface of the applicator will be the axis passing through the two ends of the orifice, in the direction of its length, located on the external surface of the applicator.

The operation of the distributor 1 is as follows. First, the protective and closing cover is removed from the applicator 3. Then, the compressible body 2 is pressed so as to deliver the product P at the level of the orifices 3*c*, 3*d* of the applicator 3. The path of the product P from the interior of the compressible body 2 to the orifices 3*c*, 3*d* of the applicator 3 and passing through the distributing member 4 is illustrated in FIGS. 1 and 2 by the arrows F. A user 5 then poses his lips on the applicator 3 (FIG. 1). The distributor 1 is used horizontally (the longitudinal axis X of the distributor 1 is arranged by the user 5 substantially horizontally), so that the outlet orifices 3*c*, 3*d* of the product P are aligned vertically, one above the other. The lips of the user 5 can thus be placed naturally on the applicator 3, one lip being placed opposite a slot 3*c*, 3*d*. The lower lip may be in contact with the slot 3*c*, while the upper lip may be in contact with the slot 3*d*. Thanks to the two orifices 3*c*, 3*d* which allow a double distribution, the user 5 will be able to spread the product simultaneously on their lower lip and on their upper lip, in a lateral gesture from one edge to the other.

The product P is pushed into the applicator 3 by simple pressure on the compressible body 2. The dosage of the quantity of product can be done at the free choice of the user 5 or via dosage indicators placed on the applicator 3.

In the embodiment illustrated in FIGS. 4 to 8, the distributor 1 comprises a flexible pouch 9 which is arranged inside the elastically compressible body 2 and which contains the fluid product P to be distributed. Nonetheless, in all of the embodiments described in the present application, the distributor may or may not comprise a flexible pouch.

The flexible pouch 9 can be fixed to a neck of the distributing member 4, for example by welding.

The space E between the elastically compressible body 2 and the flexible pouch 9 is filled with air as the pouch 9 is emptied of the product it contains. The orifices 4*d* present on the collar 4*c* of the distributing member 4 allow air to enter the space E comprised between the elastically compressible body 2 and the flexible pouch 9.

The distributor 1 can comprise, between the distributing member 4 and the applicator 3, a connector 6 and a dispenser 7. The connector 6 makes it possible to direct the product P from the body 2 towards the dispenser 7.

The connection 6 covers the upper orifice 2*a* of the compressible body 2 and the cylindrical upper part 4*b* of the distributing member 4. The collar 4*c* of the distributing member 4 rests on the upper annular edge 2*b* of the body 2 which surrounds and delimits the orifice 2*a* of the body 2. The collar 4*c* is bordered by a longitudinal annular rib 2*c* of the body 2.

The connector 6 comprises a cylindrical lower part and a substantially frustoconical upper part. It comprises two outer annular walls 6*a* which are positioned about the rib 2*c* of the body 2, as well as two inner annular walls 6*b* delimiting an annular space in which the upper end of the cylindrical part 4*b* of the distributing member 4 is inserted.

The connection 6 further comprises a lateral orifice 6*c* making it possible to convey the air towards the interior of the body 2 passing through the orifices 4*d* of the distributing member. Opposite the orifice 6*c* is a deformable washer 6*d* capable of playing the role of a valve and thus of closing the orifice 6*c* when the user exerts a manual pressure on the body 2.

The dispenser 7 is intended to convey the product P coming from the distributing member 4 and having passed through the first connection 6 towards the two outlet orifices 3*c*, 3*d*. The dispenser 7 comprises a cylindrical base 7*a* resting on the upper annular edge 6*e* of the connection 6. The cylindrical base 7*a* is extended by two longitudinal tubes 7*b* which each open onto an outlet orifice 3*c*, 3*d*. Each of the two longitudinal tubes 7*b* is advantageously covered with a non-return valve 8. The non-return valves 8 can be duckbill type non-return valves. The duckbill non-return valves allow the flow to flow through a flexible tube whose end has a natural flattened shape. This flattened shape resembles a duckbill, hence the name valve. The flow opens the flattened end of the duckbill, allowing fluid to pass. When the pressure is removed from the inlet side, the end of the duckbill returns to its flattened state, cutting off the flow.

When using the distributor 1, the manual pressure exerted on the elastically deformable body 2 is transmitted to the flexible pouch 9 which contains the fluid product P. This then flows into the distributing member 4, then into the first connection 6 and in the dispenser 7 up to the non-return valves 8, which will cause the opening of the valves 8 and thus the ejection of the product P through the outlet orifices 3*c*, 3*d* of the applicator 3. No air entry into the flexible pouch 9 is allowed through the end of the valves 8. This characteristic guarantees the stability and conservation of the formulation of the fluid product. The compression exerted on the elastically deformable body 2 also has the effect of pressing the deformable washer 6*d* against the orifice 6*c* and preventing the air from leaving the space E through the orifice 6*c*.

When the manual pressure exerted on the walls of the elastically compressible body 2 ceases, the body 2 relaxes, the end of the non-return valves 8 is closed and the deformable washer 6*d* is deformed so as to no longer obstruct the orifice 6*c*. Air enters the space E between the elastically compressible body 2 and the flexible pouch 9 via the orifice 6*c*. The volume of air which then enters the space E then compensates for the volume of product ejected from the flexible pouch 9. As a result, the elastically compressible body 2 returns to its initial shape.

A flange 10 advantageously reinforces the stability and the tightness of the distributor 1. The flange 10 is snapped or clipped onto the elastically compressible body using two clamps 10*a* arranged on either side of the axis X of the dispenser 1. Each clamp 10*a* is inserted into a reception zone 2*d* arranged on the upper annular edge 2*b* of the elastically compressible body 2. The flange 10 is generally in the form of a spherical segment, the upper part of the flange 10 coming into contact with the applicator 3. The flange 10 thus surrounds the connection 6 and the dispenser 7 and the upper part of the flange 10 is provided with an opening surrounding the non-return valves 8.

Finally, a protective and closing cover 11 covers the applicator 3.

In the embodiment illustrated in FIGS. 4 to 8, the distributor 1 is continuously convex, that is to say the distributor 1 is seen rounded from an external reference frame. In particular, the applicator 3 is of a convex shape and the profile S1, S2 of the outlet orifices 3*c*, 3*d* on the surface of the applicator 3 is also convex. In particular, the profile S1, S2 of the outlet orifices 3*c*, 3*d* on the surface of the applicator 3 can be a convex ellipse.

The distributor 1 can transversely have a large dimension and a small dimension, and the plane B of the axes A, A' of the outlet orifices 3*c*, 3*d* can be oriented in the direction of the large dimension (FIG. 7) or in the direction of the small dimension. The distributor 1 can in particular be in the shape of an ellipsoid.

In the embodiment illustrated in FIGS. 9 to 14, the elastically compressible body 2 of the generally convex distributor 1 may comprise a flat zone or plane 2*e*. The plane 2*e* creates a support area for the thumb, thus improving grip and making it easier to press on the container to release the fluid product. A better grip of the distributor 1 is also obtained when applying the fluid product to the lips. Finally, the plane 2*e* can act as a base when the distributor 1 is installed.

As illustrated in FIGS. 15 to 20, the applicator 3 can be half-convex, half-concave, so as to perfectly match the shape of the lips. Thus, a part of the applicator 3 comprising a first outlet orifice 3*c* may be convex, while a part of the applicator comprising a second outlet orifice 3*d* may be concave. A convex surface thus accommodates the upper lip, and a larger concave surface is adapted to the size of the lower lip. The lips naturally rest on the applicator 3 and can thus slide easily when applying the product to both lips simultaneously.

This asymmetrical applicator 3 also aims to distribute more cream on the lower lip which is fleshier than the upper lip.

In another embodiment (FIGS. 21 to 26), the applicator 3 has a convex shape and the outlet orifices 3*c*, 3*d* are each located inside a flat zone 3*e* (plane). The applicator 3 being used horizontally, the two planes 3*e* which form bevels serve as a natural stop for the lips in order to prevent the applicator 3 and therefore the fluid product from entering the mouth. The user lips 5 will naturally rest and stop on the bevels. These bevels will also guide the lips during the translation movement carried out during the application of the balm.

In this embodiment, the slots 3*c*, 3*d* are advantageously aligned in a direction corresponding to the small transverse dimension of the distributor 1. The user thus places the large transverse dimension of the distributor horizontally when distributing the product on the lips. In the previous embodiments illustrated in FIGS. 4 to 21, the slots 3*c*, 3*d* were advantageously aligned in a direction corresponding to the large transverse dimension of the distributor 1.

Finally, in a final embodiment, illustrated in FIGS. 27 to 33, and which can be combined with each of the previous embodiments, a fluid product dosing system for a given pressure is added, to improve the use of the distributor 1.

For a single dosage (FIGS. 27 to 29), the valves 8 can themselves be used. In fact, by pressing the flexible body, the product P will come out and when it covers the valves this means that the right dosage has been reached.

For a double dosage (FIGS. 30 to 33), markings 12 surrounding the duckbill valves can be screen printed on the applicator 3. A first dosage for «dry lips» is reached when the valves are covered with product (FIG. 32), and a second dosage for «very dry lips» is reached when the screen prints 12 framing the valves 8 are covered (FIG. 33).

The invention claimed is:

1. A compressible distributor of fluid product, of a longitudinal axis, the distributor comprising:

an elastically compressible body configured to accommodate the fluid product, an applicator mounted on the elastically compressible body and extending the applicator longitudinally, and a longitudinal distributing member of said fluid product configured to convey the fluid product from an interior of the elastically compressible body towards the applicator, the applicator being provided with only two outlet orifices opening onto an external surface of the applicator and allowing distribution of the fluid product, wherein each outlet orifice of the distributor has, at a level of the external surface of the applicator, a shape elongated along an axis, and wherein the axes of the two outlet orifices belong to a same plane parallel to the longitudinal axis, wherein the axes of the two outlet orifices are non-parallel, and wherein an angle between the axes of the two outlet orifices, in the same plane parallel to the longitudinal axis and as seen from inside the distributor, is between 103° and 160°.

2. The distributor according to claim 1, wherein said plane passes through the longitudinal axis.

3. The distributor according to claim 1, wherein the axes of the two outlet orifices are non-parallel.

4. The distributor according to claim 1, wherein the distributor has a large dimension and a small dimension transversely, and wherein said plane is oriented in a direction of the large dimension or in a direction of the small dimension.

5. The distributor according to claim 1, wherein the distributor is in the shape of an ellipsoid.

6. The distributor according to claim 1, further comprising a flexible pouch disposed inside the elastically compressible body and which is adapted to house the fluid product to be distributed.

7. The distributor according to claim 1, further comprising a connector and a dispenser between the distributing member and the applicator.

8. The distributor according to claim 7, wherein the connector is configured to direct the fluid product from the elastically compressible body towards the dispenser, and the connector comprises an orifice making it possible to convey air towards the interior of the elastically compressible body, as well as a washer acting as a valve provided on said orifice so as to close said orifice when a user exerts a manual pressure on the elastically compressible body.

9. The distributor according to claim 8, wherein the dispenser is configured to convey, towards the two outlet orifices, the product from the distributing member after passing through the connector, the dispenser comprising two longitudinal tubes which each open onto an outlet orifice.

10. The distributor according to claim 9, wherein each longitudinal tube is covered with a non-return valve.

11. The distributor according to claim 1, wherein the applicator is of a convex shape and wherein a profile of the outlet orifices at the outer surface of the applicator is also convex.

12. The distributor according to claim 1, wherein the distributor is convex and wherein the elastically compressible body comprises a plane.

13. The distributor according to claim 1, wherein a part of the applicator comprising a first outlet orifice of the two outlet orifices is convex, while part of the applicator comprising a second outlet orifice of the two outlet orifices is concave.

14. The distributor according to claim 1, wherein the applicator has a convex shape and wherein the outlet orifices are each located inside of a plane of the applicator.

15. The distributor according to claim 1, wherein each outlet orifice is surrounded by a marking for dosing the fluid product.

* * * * *